March 3, 1970     J. G. HAWLEY ET AL     3,498,678

LIGHTWEIGHT, HIGH STRENGTH, STAMPED WHEEL

Filed March 18, 1968

INVENTORS
JESSE G. HAWLEY
ALBERT W. COOK
JOHN W. RUNNER
CHARLES E. BARRINGTON
BY *Oldham & Oldham*
ATTORNEYS.

United States Patent Office 3,498,678
Patented Mar. 3, 1970

3,498,678
LIGHTWEIGHT, HIGH STRENGTH, STAMPED WHEEL
Jesse G. Hawley, Penn Yan, N.Y., and Albert W. Cook, Tallmadge, John W. Runner, Akron, and Charles E. Barrington, Stow, Ohio, assignors to The Goodyear Tire & Rubber Company, Akron, Ohio, a corporation of Ohio
Continuation-in-part of application Ser. No. 503,909, Sept. 23, 1965. This application Mar. 18, 1968, Ser. No. 713,960
Int. Cl. B60b 3/08
U.S. Cl. 301—63
6 Claims

ABSTRACT OF THE DISCLOSURE

A wheel formed from substantially identical wheel halves secured together by circumferentially spaced bolt means, each wheel half being formed from a metal stamping and having a radially outer annular tire bead receiving seat and a radially inward annular bearing receiving seat wherein a hub spacer portion holds the stampings in spaced relationship, and also having radially inwardly projecting fingers which support the bearing receiving seat of each stamping.

---

This is a continuation-in-part of our prior application Ser. No. 503,909, filed Sept. 23, 1965, now Patent No. 3,382,009 for "Lightweight, High Strength Stamped Wheel," and represents an improvement thereover.

Heretofore, there have been various types and kinds of lightweight wheels provided which have high strength and low cost, but these wheels are usually produced by standard methods of casting with lightweight metals, such as aluminum or magnesium. As such, there are several inherent problems which affect the quality of the wheel produced, such as quality deficiencies of the die or other type castings, lack of metal strength, fatigue characteristics, and the like.

It is the general object of the present invention to provide a lightweight stamped wheel wherein each wheel is formed from substantially identical wheel halves held in spaced relationship by an annular hub portion wherein each stamping provides an annular tire bead retaining flange and an annular bearing receiving seat.

The aforesaid objects of the invention and other objects which will become apparent as the description proceeds are achieved by providing a wheel which includes a hub, a radial load carrying stamped disc on each end of the hub, each having an integral tire bead flange at its outer periphery and a bearing supporting flange on its inner periphery, and bolt means extending through the hub to removably hold the disc in fixed relation to the ends of the hub.

For a better understanding of the invention reference should be had to the accompanying drawings wherein.

Figure 1:
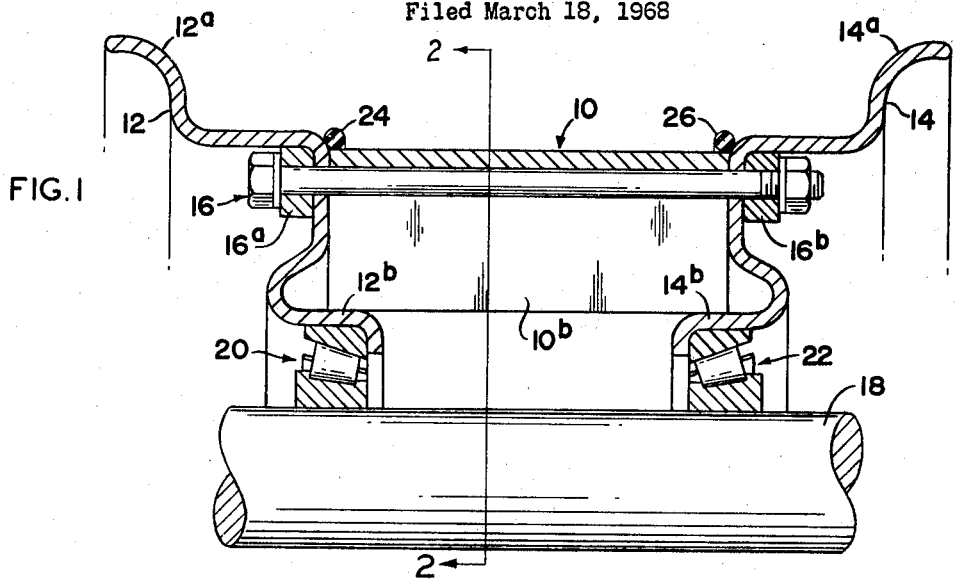
FIG. 1 is a broken-away, cross-sectional illustration of the upper half of the stamped wheel design of the invention shown in mounted position to a supporting axle.

With reference to the form of the invention illustrated in the drawings, the numeral 10 indicates generally a concentric hub or central body portion made as a one-piece extruded member, preferably from a suitable lightweight metal such as aluminum or magnesium, or a suitable strength plastic composition material. The remaining structure of the wheel comprises annular stamped end plates 12 and 14, respectively, which are held in place to the hub 10 by suitable bolt means indicated generally by numeral 16.

Each of the plates 12 and 14 is preferably stamped from some suitable metal which will be lightweight but will also give sufficient strength and structural characteristics to support a pneumatic tire and the hub 10 with relation to a mounting axle 18. Each of the plates 12 and 14 is formed by the stamping to include a radially outer tire bead retaining flange 12a and 14a, respectively, and a radially inner bearing seat 12b and 14b, respectively. Appropriate roller bearings 20 and 22, carried in seats 12b and 14b, mount the plates 12 and 14 with hub 10 to the axle 18 for rotatable support therearound, all in the usual manner known in the art for mounting wheels. It is a feature of the invention that each of plates 12 and 14 provides the tire bead retaining flange and bearing seat as an integral part of their stamped configuration. This, of course, lowers the cost on the wheel combination.

Figure 2:
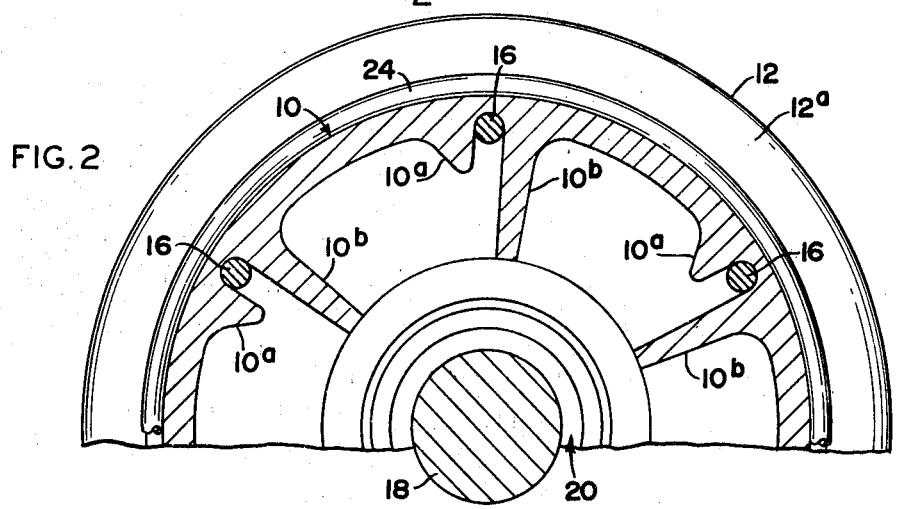
FIG. 2 is a cross-sectional illustration of the hub portion of the wheel of FIG. 1 taken on line 2—2 thereof.

In order to provide support for the bearing seats 12b and 14b, the invention contemplates that the extruded hub 10 shall have a cross-sectional configuration as shown in FIG. 2 which includes a plurality of radially inwardly projecting fingers 10a and 10b whereby the spacing between the fingers defines a carrying slot for the bolt 16, and at least the finger 10b extends down and engages with the load bearing surface of bearing seats 12b and 14b, as clearly shown when considering FIGS. 1 and 2 in combination. The bearing seats 12b and 14b are essentially parallel to the mounting axle 18, and the radially inner end of projection 10b is parallel and makes a flush engagement with the surfaces when the combination is appropriately bolted together. The carrying of the load of the bearings radially through the fingers 10b to the hub 10 properly distributes a portion of the bearing load so that overloading does not occur.

Figure 4:
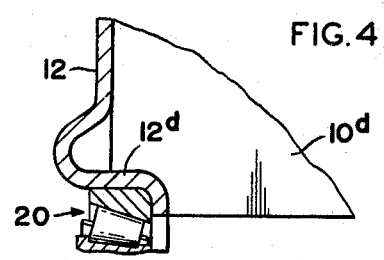
FIG. 4 is an enlarged, cross-sectional illustration of the inward projections from the hub supporting the bearing seat radially and laterally.

The projections could also be formed as illustrated in FIG. 4 where projection 10d fits around bearing seat 12d so as to provide radial and lateral support. This configuration is preferable where side loading of the wheel takes place.

While the drawing shows only one bolt 16, it should be understood that a plurality of bolts are utilized equally around the circumference of the wheel combination, with enough bolts being utilized to insure a structurally safe combination. In all events, there will be a sufficient number of projections 10b from the radially inner surface of hub 10 to insure that the bearing seats 12b and 14b will be properly supported. Of course, the nature of the extrusion will control the exact configuration of the hub 10.

In order to utilize the wheel of the invention with a tubeless-type tire, a pair of endless O-rings 24 and 26 are provided which seat adjacent the joint between the hub 10 and side plates 12 and 14. When pressure is applied to the inside of the tire (not shown) carried by the side plates 12 and 14, the rings 24 and 26 will compress into the respective joints and provide a sealed relationship of the tire with respect to the wheel combination.

Another feature of the invention is achieved by the formed wedge or washer supports 16a and 16b associated with the bolt 16. The washers 16a and 16b are curved on their radially outer surfaces to conform to the bends in plates 12 and 14. The bends are provided to give a horizontal extension to the bead receiving flanges 12a and 14a, respectively. There is considerable stress on the plates 12a and 14a at these points of 90° bending from a direction substantially perpendicular to axle 18 to a direction horizontal to axle 18, and it is found that these washers 16a and 16b greatly distribute the stress at these points and allow the combination to be bolted together and held in a solid and structurally safe unitary combination without failure at the bend points.

It should be understood that while no circumferential width is specified for the washers, they may be formed as one continuous ring, as well as separate parts.

Figure 3:
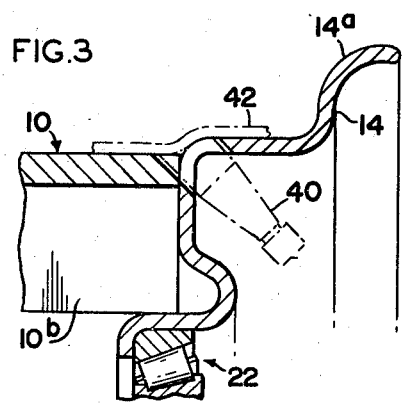
FIG. 3 is a cross-sectional illustration of a tube-type hub assembly showing the relation of the valve and tube.

The wheel may be tube-type or tubeless. FIG. 3 of the drawings illustrates the detail of a valve 40 associated with a tube 42. This configuration shows its construction with reference to the hub design of the invention.

The function and design of the hub spacer 10 are itemized as follows:

(a) The hub spacer design by having full parallel surfaces around the bolts prevents the wheel being "squeezed" together when overtightening the wheel bolts since the radial portion provides a positive clamping surface.

(b) The essential functions of the radially inwardly projecting fingers 10b on the hub spacer are to provide in a low cost, lightweight manner features which are necessary in a wheel of this type, as follows:

The wheel must meet close limits of radial and lateral runout during all load conditions, both radial and side when measured at the wheel flanges in relation to the axle. It is therefore necessary to accurately register the wheel parts in relation to each other.

The radial fingers 10b accomplish this by registering over each bearing receiving seat and also on the end face of the bearing receiving seat. When the parts are clamped together by the bolts this then prevents any radial or lateral movement of the wheel halves.

The high lateral loads being overcome by the register features of the hub spacer fingers 10b provide the most novel and important feature of this design.

(c) To prevent inherent differential rotation between each wheel half, the radial fingers are adjacent to the bolts and the slot formed at each bolt between the fingers keeps the bolts aligned. The design illustrated shows one long finger 10b and one short finger 10a at each bolt. This is done to save weight since the one finger registering on the bearing seat is adequate for load conditions.

(d) Another feature of the hub spacer design as described is that close tolerances are not required at the bolt holes since the machined register at the bearing seats provides all the location. This allows the use of extruded material for the hub spacer with adequate tolerances in the bolt slot area, again proving low cost.

(e) Concentricity of the bearing and annular tire bead receiving seat in each wheel half is provided in a simple low cost manner by housing the bearing in the same stamping which provides the tire bead seat.

While in accordance with the patent statutes only the best known embodiment of the invention has been illustrated and described in detail, it is to be particularly understood that the invention is not limited thereto or thereby, but that the inventive scope is defined in the appended claims.

What is claimed is:

1. A stamped wheel which includes an extruded central body portion having a substantially cylindrically shaped outer surface and a plurality of circumferentially spaced radially inwardly directed fingers extending from the inner surface along the full length of the central body portion, said fingers also defining bolt receiving openings, a radial load carrying stamped plate on each end of the central body portion, each having an integral tire bead retaining flange at its outer periphery and an axially extending flange providing a bearing supporting seat on its inner periphery, said fingers engaging the radially outer surface of the axially extending flange and providing lateral and radial support to the bearing supporting seat, and bolt means extending through the bolt receiving openings of the central body portion and engaging both plates to normally hold the plates in fixed relation to the ends of the central body portion.

2. A wheel according to claim 1 where the central body portion is extruded from a lightweight material from a group consisting of aluminum, magnesium, and plastic.

3. A wheel according to claim 1 where the bolt means engage the central body portion along the full length of the bolt receiving openings to prevent a relative rotation between the plates and the central body portion when the bolt means are positioned.

4. A wheel according to claim 1 where the fingers engage the plates so as to provide lateral support to the tire bead retaining flange of each plate.

5. A wheel according to claim 1 where the plates bend through about a 90° angle from the bearing supporting seat to the tire bead retaining flange, and which includes contoured washer wedge supports curved on their radially outer surfaces to conform to the bends of the plates from the bearing support seat to the tire bead retaining flange carried by said bolt means so as to fully engage the bend at least several sections around the circumference of each plate to prevent creation of local stress points when the bolt means are tightened into engaging relationship with the plates.

6. A wheel according to claim 1 which includes a pair of endless O-rings which seat adjacent the joint between central body portion and the plates so the wheel can be used with a tubeless tire.

References Cited

UNITED STATES PATENTS

| 2,230,193 | 1/1941 | Shinn. |
| 2,327,044 | 8/1943 | Horn. |
| 2,511,264 | 6/1950 | Hollerith _____ 301—62 |

FOREIGN PATENTS 156,422   11/1963   Russia.

RICHARD J. JOHNSON, Primary Examiner